(12) United States Patent
Henderson et al.

(10) Patent No.: US 7,058,789 B2
(45) Date of Patent: Jun. 6, 2006

(54) SYSTEM AND METHOD FOR PACKET STORAGE AND RETRIEVAL

(75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 10/358,548

(22) Filed: Feb. 4, 2003

(65) Prior Publication Data

US 2004/0037276 A1    Feb. 26, 2004

Related U.S. Application Data

(60) Provisional application No. 60/354,405, filed on Feb. 4, 2002.

(51) Int. Cl.
G06F 12/06    (2006.01)
H04J 13/00    (2006.01)

(52) U.S. Cl. ............ 711/220; 370/469; 370/466; 370/476; 370/392; 711/206; 711/221; 709/230

(58) Field of Classification Search ........... 370/469; 711/220; 707/230; 710/52, 56
See application file for complete search history.

(56) References Cited

U.S. PATENT DOCUMENTS 5,793,954 A * 8/1998 Baker et al. ............... 709/250
6,618,378 B1    9/2003 Giroux et al.
6,826,669 B1 * 11/2004 Le et al. ..................... 711/173
2002/0097675 A1    7/2002 Fowler et al.
2002/0163909 A1 * 11/2002 Sarkinen et al. ............ 370/386
2002/0163935 A1 * 11/2002 Paatela et al. .............. 370/466
2003/0140195 A1    7/2003 Borkenhagen et al.
2003/0189932 A1 * 10/2003 Ishikawa et al. ............ 370/392
2003/0195973 A1 * 10/2003 Savarda ...................... 709/230

* cited by examiner

Primary Examiner—Donald Sparks
Assistant Examiner—Jesse Diller
(74) Attorney, Agent, or Firm—Blakely, Sokoloff, Taylor & Zafman LLP

(57) ABSTRACT

A network services processor receives, stores, and modifies incoming packets and transmits them to their intended destination. The network services processor stores packets as buffers in main and cache memory for manipulation and retrieval. A memory subsystem stores packets as linked lists of buffers. Each bank of memory includes a separate memory management controller for controlling accesses to the memory bank. The memory management controllers, a cache management unit, and free list manager shift the scheduling of read and write operations to maximize overall system throughput. For each packet, packet context registers are assigned, including a packet handle that points to the location in memory of the packet buffer. The contents of individual packets can be accessed through the use of encapsulation pointer registers that are directed towards particular offsets within a packet, such as the beginning of different protocol layers within the packet.

19 Claims, 9 Drawing Sheets

SYSTEM AND METHOD FOR PACKET STORAGE AND RETRIEVAL

CROSS REFERENCE TO RELATED APPLICATIONS

This application claims the benefit of U.S. Provisional Application No. 60/354,405, filed Feb. 4, 2002, which is hereby incorporated in its entirety by reference.

BACKGROUND

1. Field of the Invention

The invention relates to the processing of data by a network services processor. More specifically, this invention relates to the organization of memory subsystems of a network services processor.

2. Background of the Invention

Current computer communications systems transfer data from one computer to another using a network such as the Internet for example. Data that is transferred is divided into smaller blocks of data called packets. Each packet is placed onto the network by a transmitting computer, where it is processed by one or more routers or switches that receive the packet and determine an address indicating where the packet needs to be sent so that it can be received by an appropriate receiving computer.

To meet the constantly increasing burdens of large-scale network traffic, modern switches must typically process large numbers of packets, modifying each packet, and passing them along to their appropriate destinations. Performing a large variety of modifications to the packet at the router requires access to packets by the router at rates that are currently unavailable. As network burdens increase, the need to perform billions of packet manipulation actions per second strains customary hardware resources. The limitations of conventional memory arrangements create bottlenecks on packet access performance.

What is needed is an architecture that allows for a greater level of packet access, retrieval, and modification.

SUMMARY OF THE INVENTION

A network services processor receives, stores, and modifies incoming packets and transmits them to their intended destinations. The network services processor stores packets as buffers in main and cache memory for manipulation and retrieval. A memory subsystem stores packets as linked lists of buffers. The memory subsystem manages access to packet storage. Each bank of memory includes a separate memory management controller for controlling accesses to the memory bank. The memory management controllers, a cache management unit, and free list manager shift the scheduling of read and write operations to maximize overall system throughput. For each packet, packet context registers are assigned, including a packet handle that points to the location in memory of the packet buffer. The contents of individual packets can be accessed through the use of encapsulation pointer registers that are directed towards particular offsets within a packet, such as the beginning of different protocol layers within the packet.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENTS

Figure 1:
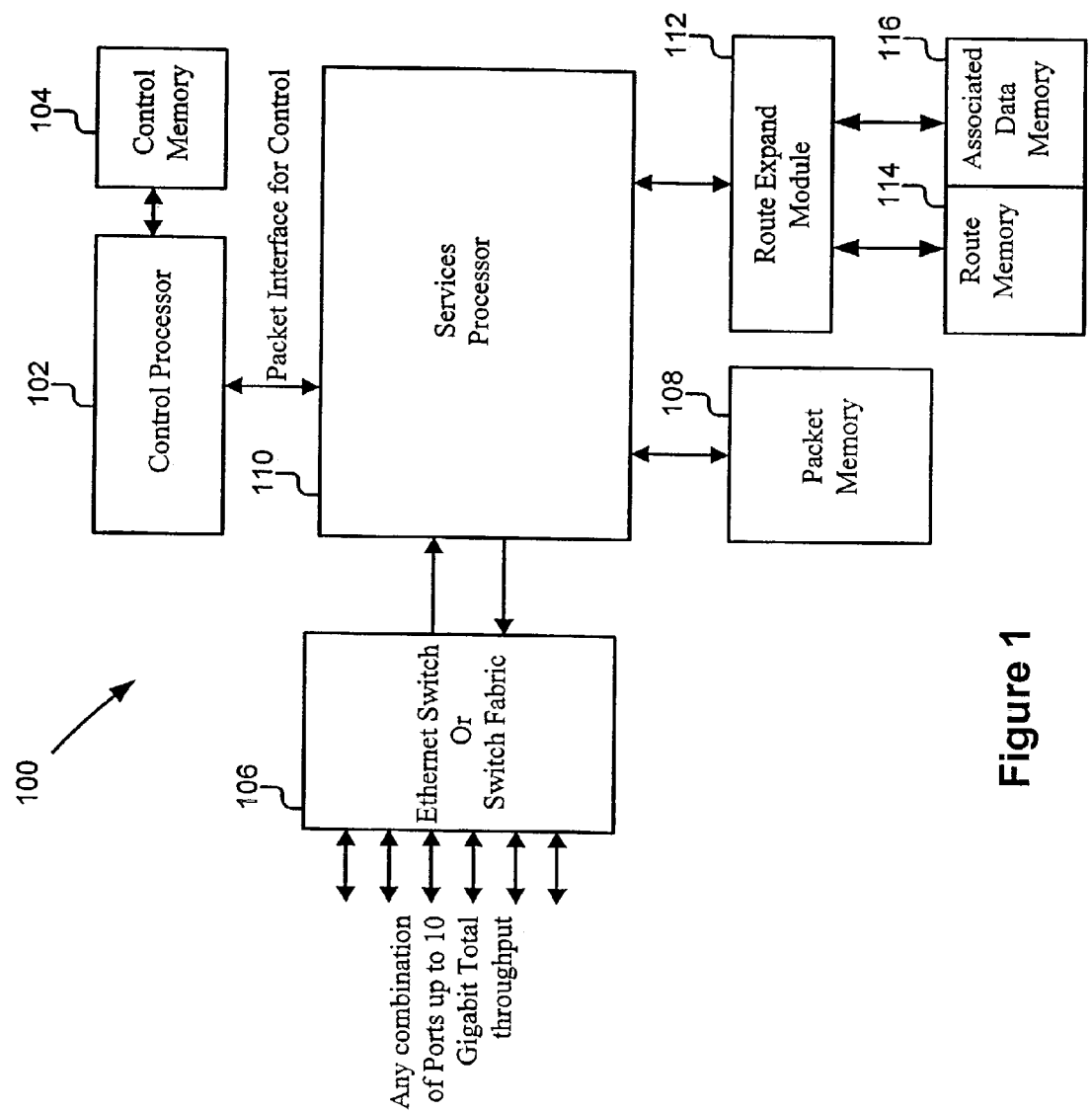
FIG. 1 is a block diagram illustrating an exemplary use of a full duplex, multiple port services processor according to the present invention.

The present invention comprises a network processor for the efficient transmission and routing of network packets. Referring now to FIG. 1, an exemplary use of a full duplex, multiple port services processor 110 according to the present invention is shown. FIG. 1 illustrates the services processor 10 as part of a highly integrated Ethernet MAN access switch 100 with a 10 gigabit aggregate throughput. While present invention will be described in this context, those skilled in the art will recognize that the services processor 10 of the present invention can be designed for other data rates and has a variety of other uses including but not limited to being part of multi-service switches, metro switches, content switches, stateful firewalls, network probes enterprise routers, multi-protocol routers, Label Edge Routers (LER) and Label Switched Routers (LSR) (IP routers), wireless base stations, bandwidth managers, DSLARs and fast firewalls. As shown in FIG. 1. the Ethernet MAN access switch 100 preferably comprises a control processor 102, a control memory 104, an Ethernet switch or switch fabric 106, a packer memory 108, the services processor 110, a route expand module 112, a route memory 114, and associated data memory 116.

The control processor 102 is coupled to the services processor 110 by a packet interface and to the control memory 104 by a memory bus. The control processor 102 provides routing and switching protocol support for the services processor 110. The control processor 102 uses the packet interface for control plane functions such as configuration and event messages. Packets can also be sent to and received from the services processor 110 by the control processor 102 using the control plane. Thus, the operations and processing performed by the services processor 110 can be fully controlled using the control processor 102 and routines stored in the control memory 104.

The services processor 110 provides advanced switching functions (VPLS bridging, IP routing, fire walling, content switching including TCP termination) and feature processing (ACL and Subscriber Management) in this example. The services processor 110 is responsible for processing the packets to provide the appropriate routing and filtering as prescribed by the control processor 102. The services processor 110 is coupled to the Ethernet switch 106 for receiving and sending such packets. The services processor 110 is also coupled to the packet memory 108. The packet memory 108 is used to store packets prior to, during and after processing by the services processor 110. Finally, the services processor 110 is also coupled to the route expand module 112 that in turn is coupled to the route memory 114 and the associated data memory 116. The route expand module 112 is used to access large tables used by the services processor 110. For example, tables such as large label tables, route tables, and flow ID tables are stored in the route memory 114 and the associated data memory 116, and can be retrieved into a cache of the services processor 110 by the route expand module 112. One embodiment of this is described in patent application 60/402,359, filed Aug. 8, 2002, titled, "Tree Data Structure With Range-Specifying Keys and Associated Methods and Apparatuses," which is incorporated by reference.

Figure 2A:
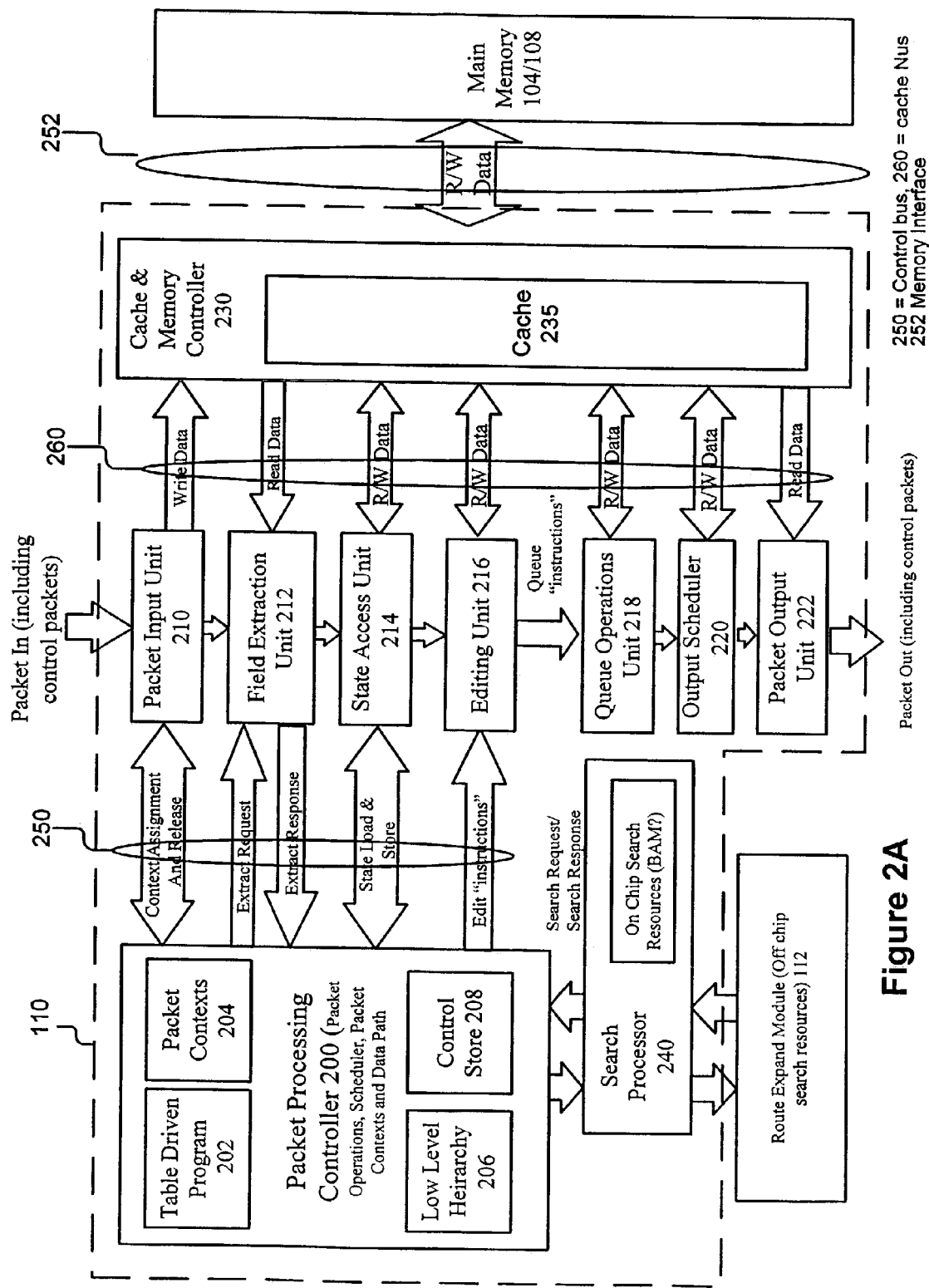
FIG. 2A is a block diagram illustrating one embodiment of a services processor in greater detail.

Referring now to FIG. 2A, one embodiment for the services processor 110 is shown in more detail. Specifically, FIG. 2A shows the components of the services processor 110 and their coupling to the route expand module 112, and the main memory 104/108. In one embodiment, the services processor 110 is manufactured as a single integrated circuit with the route expand module 112, and a main memory 104/108 being separate integrated circuit chips. In the embodiment shown, the services processor 110 preferably comprises a packet processing controller 200, a packet input unit 210, a field extraction unit 212, a state access unit 214, an editing unit 216, a queue operations unit 218, an output scheduler 220, a packet output unit 222, a cache and memory controller 230 that includes a cache 235, and a search processor 240. The packet processing controller 200 is coupled by a control bus 250 to the packet input unit 210, the field extraction unit 212, the state access unit 214, and the editing unit 216. The cache and memory controller 230 is coupled to the packet input unit 210, the field extraction unit 212, the state access unit 214, the editing unit 216, the queue operations unit 218, the output scheduler 220, the packet output unit 222 by a cache bus 260.

The packet processing controller 200 controls the operation of the services processor 110 in its processing and filtering of packets. The packet processing controller 200 is a control engine that controls the packet input unit 210, the field extraction unit 212, the state access unit 214, and the editing unit 216 as will be described in more detail below. The packet processing controller 200 preferably uses a table driven approach to control how packets are processed. The packet processing controller 200 preferably includes a table entry processor 202, one or more packet contexts 204 for each packet being processed, a low level hierarchy 206 and a control storage area 208. The low level hierarchy 206 and the control storage area 208 are part of the working memory of the packet processing controller 200 and provide additional areas for storing data need to process a packet.

The table entry processor 202 is part of the packet processing controller 200 and in response to commands by the table entry processor 202, the packet processing controller 200 issues control signals on the control bus 250 to the packet input unit 210, the field extraction unit 212, the state access unit 214, the editing unit 216, and/or issue instructions to the search processor 240. Execution of the table driven program by the table entry processor 202 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

The table entry processor 202 retrieves program entries through use of the search processor 240 and then processes the entries and sends command signals to the packet processing controller 200. In response, the packet processing controller 200 issues control signals on the control bus 250 to the packet input unit 210, the field extraction unit 212, the state access unit 214, the editing unit 216, and/or issue instructions to the search processor 240. Execution of the table program entry by the table entry processor 202 within the packet processing controller 200 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

A separate packet context 204 is used by the packet processing controller 200 for each packet as that packet traverses through the packet input unit 210, the field extraction unit 212, the state access unit 214, and the editing unit 216. The packet context 204 is a register set that keeps track of information associated with a packet while that packet is being processed. The packet context 204 includes several different kinds of registers. The packet context 204 preferably includes registers that determine which tables are currently controlling packet processing (analogous to a program counter in a CPU), and where in a packet the various protocols start (Encapsulation Pointers). For example, the packet context 204 includes registers with the following functions: a next instruction register that points to the next instruction to be processed for this packet context, multiple instruction registers are used to create an instruction stack to support action and lookup tables analogous to subroutines in a CPU; a table handle register that points to the next lookup table to be processed in this packet context; a search result register that contains the result of the last search issued; a packet handle register that points to the packet associated with this packet context; one or more encapsulation pointer registers that acts as index registers for access to data in the packet pointed to by the packet handle register; one or more edit registers used by a packet editor to assemble complex edits that are applied to the packet; one or more key registers used to assemble multi-field search keys; one or more State Record Handle Registers used to access state data and a packet/context template handle used to access a block of packet buffer memory to load multiple registers in the packet context, as the source for a create packet operation, and as the source for a add encapsulation operation.

The packet processing controller 200 is also coupled to search processor 240 to send search requests and receive search responses. The search processor 240 is coupled to and interfaces with the route expand module 112 to retrieve data stored in the memories 114, 116 associated with the route expand module 112. In one embodiment, the search processor 240 includes resources for performing searches such as a Boundary Addressable Memory (BAM). The search processor 240 can search for the next table program entry to be processed by the table entry processor 202, a result from a lookup table stored in memory as directed by the table entry processor 202, or other information. One embodiment of this BAM is described in patent application Ser. No. 10/005,986, filed Nov. 7, 2001, titled, "Boundary Addressable Memory," which is incorporated by reference.

One particular advantage of the present invention is the inclusion of the cache and memory controller 230 in the services processor 110. The cache and memory controller 230 is coupled to main memory 104/108 via a memory interface 252, and is coupled to the cache bus 260. The cache and memory controller 230 is preferably large enough so that many applications can execute exclusively out of cache 235. The cache and memory controller 230 effectively hides the latency of memory accesses from the services processor 110. The cache and memory controller 230 are designed to optimize data across the memory bus and will return data out of order from memory if necessary. The cache and memory controller 230 may also be locked to enhance performance such as to ensure that cache includes all data structure components or locking the top of the hierarchy in cache to accelerate insertions. It should be understood that both the packet data as well as other state and control information may be stored in the cache 235. If lookup tables or action table program entries are stored in cache 235 or main memory 108, a memory access unit (not shown) adapted for the type of information being retrieved will be included in the services processor 110. The packet processing controller 200 will then use the memory access unit, such as a lookup table access unit or action table access unit to retrieve results from the lookup table or retrieve action entries.

The packet input unit 210 processes the packets as the services processor 110 first receives them. The packet input unit 210 is coupled to signal line 120 to receive packets from the Ethernet switch 106. The packet input unit 210 is also coupled to the cache and memory controller 230 by the cache bus 260 for storing the packets in the cache and memory controller 230. The packet input unit 210 stores the packet data into one or more free blocks in the cache 235. The packet input unit 210 is also coupled to the packet processing controller 200 by the control bus 250. The packet input unit 210 notifies the packet processing controller 200 that a new packet is being received. As soon as the first block has been filled or an end of packet is detected, the packet processing controller 200 assigns the packet a packet context 204 and initial table handle, and the other registers in the packet context 204 are cleared. The packet context is released for further processing by the packet processing controller 200.

Once a packet is released for further processing, packet processing controller 200 performs actions in a table specified by the initial table handle. These will typically be packet parsing operations such as extracting a field from the packet and putting the field into one or more key registers to construct a key.

The field extraction unit 212 is coupled to the cache and memory controller 230 by the cache bus 260 for reading data out of cache 235 and memory 104/108. The field extraction unit 212 is also coupled to the packet processing controller 200. The field extraction unit 212 is responsive to extract requests from the packet processing controller 200 and sends extract responses for further processing by the packet processing controller 200. The function of the field extraction unit 212 is to retrieve packet data from the cache, extract the portions of packets referenced or addressed by extract requests, and return the extracted data to the packet processing controller 200. If the packet processing controller 200 requests packet data from a portion of the packet that has not yet been stored in cache the processing of the requesting packet context will be suspended until the data is received.

The state access unit 214 processes state load and store requests from the packet processing controller 200. The state access unit 214 is coupled to the cache and memory controller 230 by the cache bus 260 for reading and writing data into and out of cache 235. The state access unit 214 is also coupled to the packet processing controller 200 to receive state change commands. More particularly, each packet context 204 preferably has a plurality of state registers and the packet processing controller 200 may maintain state tables. The data in the state tables is modifiable as is the data in the state registers. The state access unit 214 increases the processing throughput by retrieving the state information, updating and maintaining state data table information in response to instructions from the packet processing controller 200.

One particular advantage of the services processor 110 of the present invention is the ability to edit packets before they are output. The editing unit 216 is responsible for packet editing performed by the services processor 110. The editing unit 216 is coupled to the packet processing controller 200 and responsive to edit instructions received from the packet processing controller 200. The editing unit 216 is also coupled to the cache 235 to read and write data including packet data. For example, the editing unit 216 performs a variety of packet modification functions such as: inserting data in a packet, deleting data from a packet, overwriting data in a packet, adding or subtracting a constant, another piece of packet data or register value from data in a packet, recalculating checksums in a packet, performing hashing operations on fields in a packet, packet creation, packet replication, packet segmentation, and packet re-assembly. More specifically, exemplary packet modification operations that occur as part of the output process include: 1) Drop Packet—The drop packet instruction recycles the buffers used for the packet; 2) Output Packet—The output packet instruction causes the edit process to apply all accumulated edits and send it to the queue specified by the queue handle in the output instructions user data component; 3) Sync Edits—The sync edits instruction causes the edit process to apply all accumulated edits and sends it to the head of the input overflow queue; 4) Copy and edit—The copy and edit instruction creates a copy of the packet and sends it to the head of the input overflow queue, and cause the edit process to apply all accumulated edits and send it to the queue specified by the queue handle in the output instructions user data component; 5) Edit and copy—The edit and copy instruction causes the edit process to apply all accumulated edits and sends it to the queue specified by the queue handle in the output instructions user data component and creates a copy of the packet and send it to the head of the input overflow queue; and 6) Copy and Output—The copy and output instruction creates a copy of the packet, causes the edit process to apply all accumulated edits and sends it to the queue specified by the queue handle in the output instructions user data component. Once all packet editing has been performed on a particular packet, a queue instruction output by the editing unit 216 to the queue operations unit 218.

The queue operations unit 218 handles the ordering of packets before they are output. The services processor 210 groups or orders the packets into queues for output. The queues are preferably maintained in cache 235 and include a queue control block and link lists of packets. The queue operations unit 218 is coupled to receive queue instructions once the editing unit 216 has processed the packets. The queue operations unit 218 also has the capability to recorder packet for outputting. This helps ensure that the packets are output in the order received. The queue operations unit 218 is coupled to the cache 235 to prepare the data for output and maintain the queues in the cache 235. The operations unit 218 also manages the length of each queue to shape traffic responsive to queue instructions.

Sometime after the packets have been added to a queue by the queue operations unit 218, the output scheduler 220 removes them and sends them to packet output unit 222. The output scheduler 220 is coupled to read and write data from the cache 235. The output scheduler 220 preferably uses a hybrid list/calendar queue to determine the priority for outputting the packets. Transmit shaping is accomplished by associating a group of queues with a scheduler. When a queue is associated to a scheduler its scheduling parameters are initialized. The output scheduler 220 supports multiple scheduling algorithms including: a prioritized scheduler where the scheduler serves the queues in strict priority order; a weighted fair scheduler where scheduler serves the queues in proportion to their weight; a dual token bucket scheduler; a rate limited scheduler; or a Earliest Deadline First (EDF) scheduler. Once scheduled, the packet output unit 222 retrieves the packets from cache and outputs then from the services processor 110. The packet output unit 222 is coupled to the cache 235 by the cache bus 260 and has its output coupled by signal line 122 to the Ethernet switch 106.

Figure 2B:
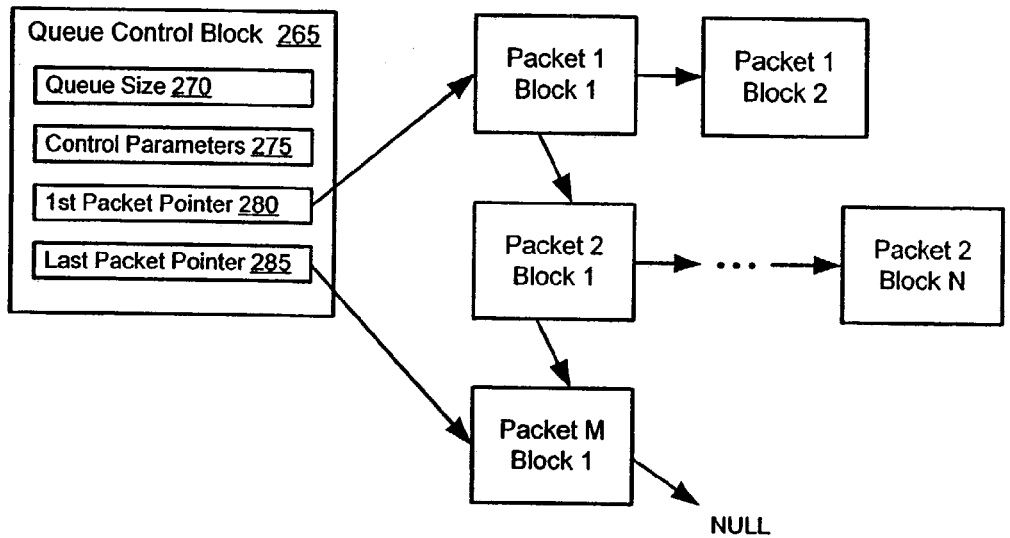
FIGS. 2B and 2C are block diagrams illustrating the structure of a queue according to one embodiment, in which the queue stored in cache is implemented as a linked list of packets, which are implemented as a linked list of blocks.
Figure 2C:
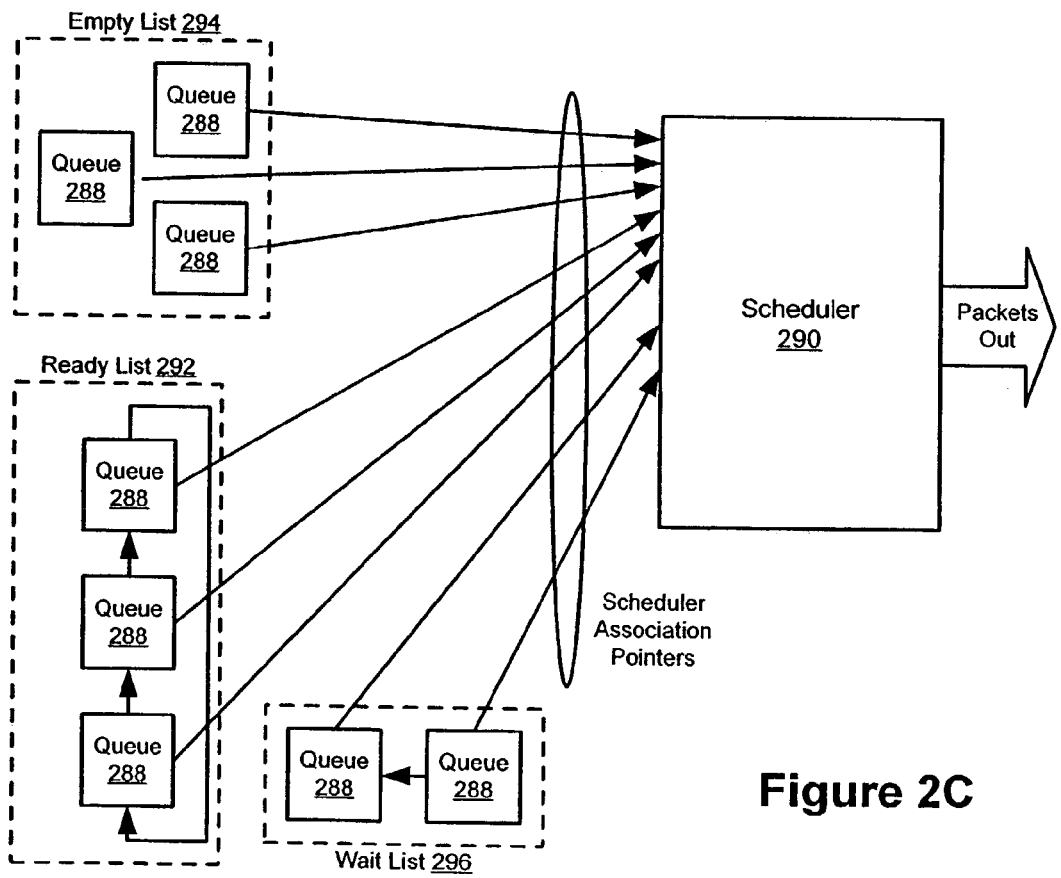

FIGS. 2B and 2C show the structure of a queue according to one embodiment, in which the queue stored in cache 235 is implemented as a linked list of packets, which are implemented as a linked list of blocks. With this structure, memory can be used efficiently to store a few large packets, a lot of small packets, or a mixture of packets of assorted sizes. A queue control block 265 is used to describe the queue. The queue control block 265 contains the queue size 270, control parameters 275, a first packet pointer 280, and a last packet pointer 285. The control parameters 275 may include data such as maximum queue size and/or RED/WRED parameters such as average queue size, exponential decay constants, and thresholds, which are used to manage the queue and are discussed in more detail below. The first packet pointer 280 indicates the location in the cache 235 of the first logical packet 282 in the queue. Each packet 282 is a linked list of one or more blocks 284 of data, and the first block 284 of each packet 282 points to the first block 284 of the next logical packet 282 in the queue. The last packet 282 in the queue points to null. The last packet pointer 285 is optional and included to facilitate the insertion of new packets 282 into the queue. The queue is references by the services processor 110 using the address of the queue control block 265, a queue handle.

The queue is operated on using queue instructions, which include: creating a new queue, adding or removing a packet from the queue, destroying a queue, and flushing a queue to remove all packets associated with it. When these operations are performed on a queue, the data in the corresponding queue control block 265 are updated or initialized as required. When a packet is "added to a queue" queue depth is checked. Congestion avoidance algorithms like RED can be performed when packets are added to queues. These functions provide a high level of flexibility for creating queues.

To avoid having all of packet memory consumed by a single queue, a packet discard algorithm is implemented. The control parameters 275 in the queue control block 265 contain a maximum size. When a new packet 282 is added to a queue, the current queue size plus the size of the packet 282 is compared to this maximum size. If adding the packet 282 to the queue will cause it to exceed the maximum size, the packet 282 is dropped. However, hard queue size limits have been found to cause a problem akin to cache thrashing, which occurs when multiple packets are dropped as the maximum queue size is reached, causing a burst of retransmissions, queue overflow, and more packet loss. This is referred to a "Global Synchronization," and the classical solution to this problem is Random Early Detection or RED. RED solves this problem by discarding packets randomly at a level below the maximum queue size. The RED algorithm estimates the average queue depth using a first order infinite impulse filter. The average queue size is then compared to the minimum and maximum thresholds. Packets are never dropped when the average queue size is below the minimum threshold, and packets are always dropped when the average queue size is above the maximum threshold. However, if the average queue size is between the minimum and maximum thresholds, the drop rate is proportional to the average queue size. The control parameters 275 in the queue control block 265 include the RED parameters for this algorithm, allowing the packet dropping behavior for each queue to be tuned separately.

Sometime after the packets have been added to a queue by the queue operations unit 218, the output scheduler 220 removes them and sends them to packet output unit 222. The output scheduler 220 is coupled to read and write data from the cache 235. The output scheduler 220 preferably uses a hybrid list/calendar queue to determine the priority for outputting the packets. Transmit shaping is accomplished by associating a group of queues 288 with a scheduler 290. Queues for transmit shaping and scheduling will typically be created as part of the configuration and startup process for the services processor 110. When a queue 288 is associated to a scheduler 290, its discard algorithms and scheduling parameters are initialized. The output scheduler 220 supports multiple scheduling algorithms, including: a prioritized scheduler, where the scheduler serves the queues in strict priority order; a weighted fair scheduler, where scheduler serves the queues in proportion to their weight; a dual token bucket scheduler; a rate limited scheduler; and an Earliest Deadline First (EDF) scheduler. Once scheduled, the packet output unit 222 retrieves the packets from a queue stored in the cache 235 and outputs the packets from the services processor 110. The packet output unit 222 is coupled to the cache 235 by the cache bus 260 and has its output coupled by signal line 122 to the Ethernet switch 106.

To effect transmit shaping, the queue control block 265 includes data fields corresponding to the queue's ready time, last transmit time, weight, and credit. In this context, credit is a measure of how much time the queue has earned by waiting, and weight is a measure of the queue's importance of priority in the scheduling. A queue's credit and weight are initialized when the queue is allocated. When a new packet is added to an empty queue, the credit is calculated by multiplying the time since the last transmission by the queue's weight. This calculated credit is fixed at or below a predetermined maximum value to prevent the credit from becoming too large, which could in turn cause the queue to hog the system's resources for too long. Once a queue's credit is greater than the size of the next packet in the queue to be served, the queue is added to the list 292 of queues ready for service. When a queue is served, the packet at the head of the queue is removed from the queue, and the size of this packet is subtracted from the queue's credit. If the queue is empty after the packet is removed, the queue is removed from the ready list 292 and placed in the empty list 294. If the remaining credit is greater than the size of the next packet at the head of the queue, the ready time/last transmission time is set to be:

current time+(packet size−credit)/weight, and the queue is added to the wait list 296. Preferably, the wait list 296 is sorted by when each queue will have sufficient credit to send packet at head.

The scheduler 290 may be implemented as a "work conserving" scheduler, which always serves the next queue having data to send as soon as possible. This allows individual queues to consume more than their allocated bandwidth if other queues are not utilizing their full bandwidth. Alternatively, the scheduler 290 may be implemented as a "non-work conserving" scheduler, which will not serve a queue until or after the system clock has reached the scheduled transmission time. This scheme limits each queue to its configured rate. In another variant, the scheduler 290 reschedules queues based on the "deadline" of the packet at the head of the queue, called earliest deadline first (EDF).

Another feature of the scheduling system is that it is hierarchical. The output of a scheduler 290 may be associated with an output port of the services processor 110, or it may be associated with the input of another queue. In the former case, when a scheduler 290 serves a queue, the services processor 110 outputs the first packet of that queue over signal line 122. In the latter case, when a scheduler 290 serves a queue, the packet at the head of the queue is removed from the queue and added to the queue to which the output of the scheduler 290 is associated. This enables the queues to be organized hierarchically and thus allows for complex traffic shaping systems to be implemented. For example, a linear priority scheduler could be associated to an output port, and its highest priority input could be the output of a weighted fair scheduler that services all of the constant bandwidth traffic in the processor. The RED parameters of these queues could be set limit the throughput to the level paid for by an associated subscriber.

Figure 3:
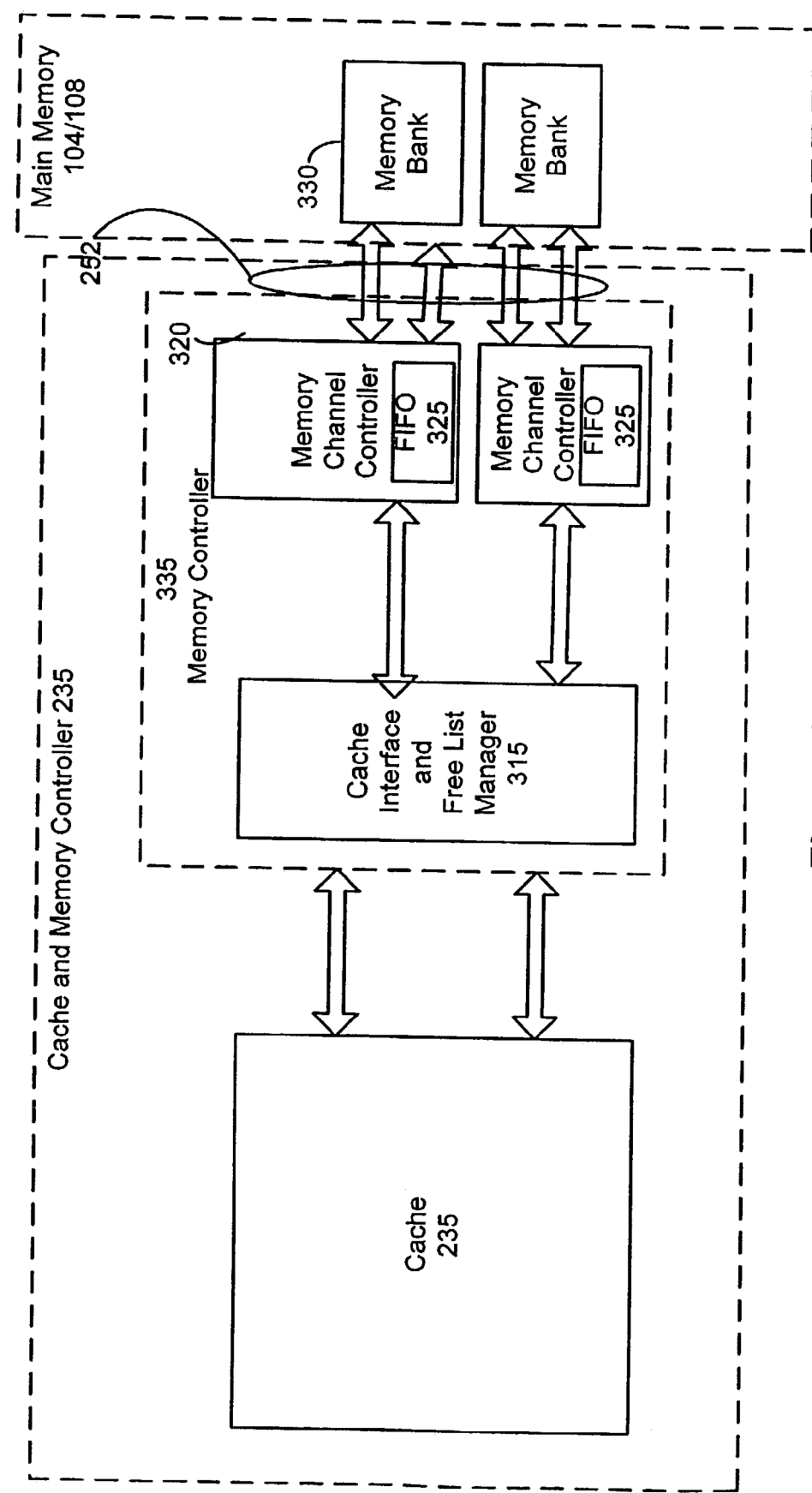
FIG. 3 is a block diagram illustrating a memory subsystem of the services processor.

FIG. 3 is a block diagram illustrating a memory subsystem of the services processor 110. The memory subsystem includes the cache and memory controller 230 which includes the cache 235 coupled to a memory controller 335. The memory controller 335 includes a group of independent memory channel controllers 320 that are respectively coupled to banks of off-chip memory 330. The banks of off-chip memory 330 are preferably part of the main memory 104/108. Each memory channel controller 320 processes read and write requests for its associated bank of off-chip memory 330 and allocates memory according to a First In First Out (FIFO) queue. Unlike conventional memory controllers, the memory channel controllers 320 are configured to maximize throughput rather than latency. Thus, the memory channel controllers 320 process requests outside the order in which they are received to maximize throughput.

The memory channel controllers 320 maintain FIFOs 325 for pending read and write requests. If multiple read requests are pending in the FIFO 325 for overlapping blocks of memory, the memory channel controller will shift the position of one of the requests so that another request for a non-overlapping section is allowed to go forward and the entire FIFO 325 is not held up while the second overlapping request waits for the memory block to be available. For example, if a first pending read request is directed towards memory range 10000 to 15000, a second, subsequent request is directed towards memory range 12000 to 17000, and a third request is directed towards memory range 20000 to 22000, the second request would normally have to wait for the first request to be completed before moving forward in the prior art, and the third request would be allowed to go forward after the second request. However, the memory channel controller 320 is configured to detect the request overlap and shift forward the third request ahead of the second request. The third read operation can be performed before the first is finished, thus increasing the overall throughput of the memory subsystem.

When the memory channel controller 320 receives a read request for a particular block of memory it checks pending write transactions. If a write transaction is pending for the requested block of memory, the memory channel controller 320 moves the read request ahead in the FIFO 325, generates a read response from the data in the write request and suppresses the pending read request. In one embodiment, the memory banks 330 comprise Reduced Latency Dynamic Random Access Memory (RLDRAM). While two memory banks 330 and memory channel controllers 320 are shown, any number of banks and memory controllers can be used by the memory subsystem.

A cache interface and free list manager 315 is coupled to the memory controllers 320. The cache interface and free list manager 315 maintains a bit map indicating which data structures are permitted in each memory bank 330. For example, a first memory controller could be attached to a bank of Static Random Access Memory (SRAM) which is reserved for scheduler data structures.

The cache interface and free list manager 315 generates separate free lists for each bank of memory 330. The free lists are sorted according to various data types (queue control blocks, scheduler data structures, and data buffers) and indicates those blocks of memory that are available in each bank 330 for each data type.

A fully associative cache memory 235 is coupled to the memory controller 335. The cache memory 235 accelerates memory performance by storing recently used data according to a weighted Least Recently Used (LRU) algorithm. According to the cache maintenance algorithm, memory locations that have been accessed less recently and frequently are replaced with new data when the cache is full. Segments of memory are assigned costs according to their frequency of use, with least frequently used data assigned a higher cost. The cache elements can be weighted according to data type (scheduler data: 1, queue control blocks: 2, head buffer: 3, and body buffers: 4). The cost determined according to frequency of use is multiplied by the multiplier to determine an overall cost. When a new element is cached, the cache 235 removes elements having the highest overall cost.

The cache memory 235 also serves to block the latency of memory requests. As all packet accesses go through the cache 235, the cache 235 can shield the remainder of the latency effects of the non-sequential accesses by the memory channel controllers 320. The cache 235 communicates with the queue operations unit 218 which preferably stores all queues within the cache. The queue operations unit 218 reorders the packets as necessary to insure that packets exit the services processor 110 in the appropriate order. For example, if a memory channel controller 320 returns two packets in a thread out of order, the queue operations unit 218 generates a reorder queue and organizes the packets according to their respective timestamps.

Figure 4:
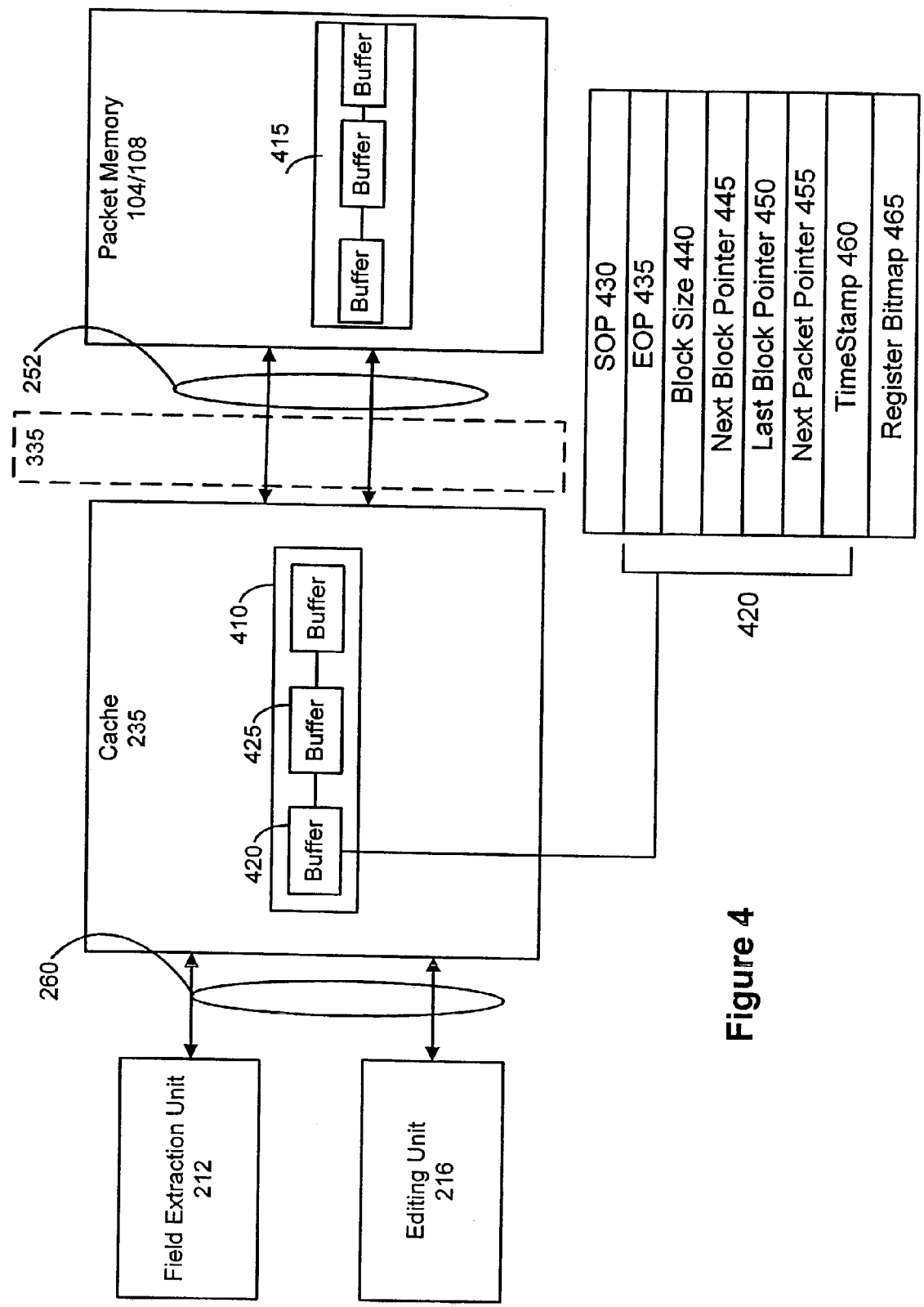
FIG. 4 is a block diagram illustrating the caching and extraction of packet buffer data.

FIG. 4 is a block diagram illustrating the caching and extraction of packet buffer data. The cache 235 is coupled to the packet memory 104 through the memory interface 252 and the memory controller 335. The field extraction unit 212 and editing unit 216 interact with the cache 235 through the cache bus 260. The editing unit 216 performs write operations on the packets stored in the cache 235 and memory 104, while the field extraction unit 212 performs read operations on the packets. Packet data is stored in groups 410, 415 of buffers, each group containing the buffers for a single packet. The packet data can be organized in to queues of packets, with each packet containing a pointer to the memory location of the next packet.

Each buffer includes a start of packet bit (SOP) 430, an end of packet bit (EOP) 435, a block size 440 indicating the size of the memory block, and a next block pointer 445 indicating the location in memory 104 of the next block in the packet. This data is preferably stored at predetermined offsets within the buffer so that it can be located easily. Additionally, the first buffer 420 stores information related to the organization of the packet and its associated queue. This information includes a last block pointer 450 indicating the memory location of the last buffer in the packet, a next packet pointer 455 indicating the memory location of the next packet in the queue, a timestamp 460 indicating the entry time of the packet, and a bitmap 465 of the packet's associated packet context registers.

Packet editing and lookup commands received by the packet processing controller 200 are typically directed towards offsets in the packets rather than buffer locations. The packet contexts 204 include packet handles that point towards the memory location of the first buffer 420 in a packet. Thus, control data in the first packet can be manipulated by directing a write operation towards an offset of the packet handle. Thus, an editing operation that aims to manipulate data stored 10 bytes past the beginning of the first buffer 420 can be directed to packet handle +10. For data stored outside the first buffer, the packet process controller 200 generates a Content Addressable Memory (CAM) table that translates offsets that go past the first buffer to the buffer storing that data. The table preferably includes at least one field indicating a range of offsets and a second field indicating the beginning location in packet memory 104 containing those offsets. The table is generated by using the packet handle to determine the location of the first buffer in the packet. The packet process controller 200 reads the location of the next buffer from the first buffer and stores the location in the CAM table. The services processor 110 follows the packet through each subsequent entry, extracting the block size and location of the next buffer, until it has generated a table indicating the memory locations of all the offsets within the packet.

Figure 5:
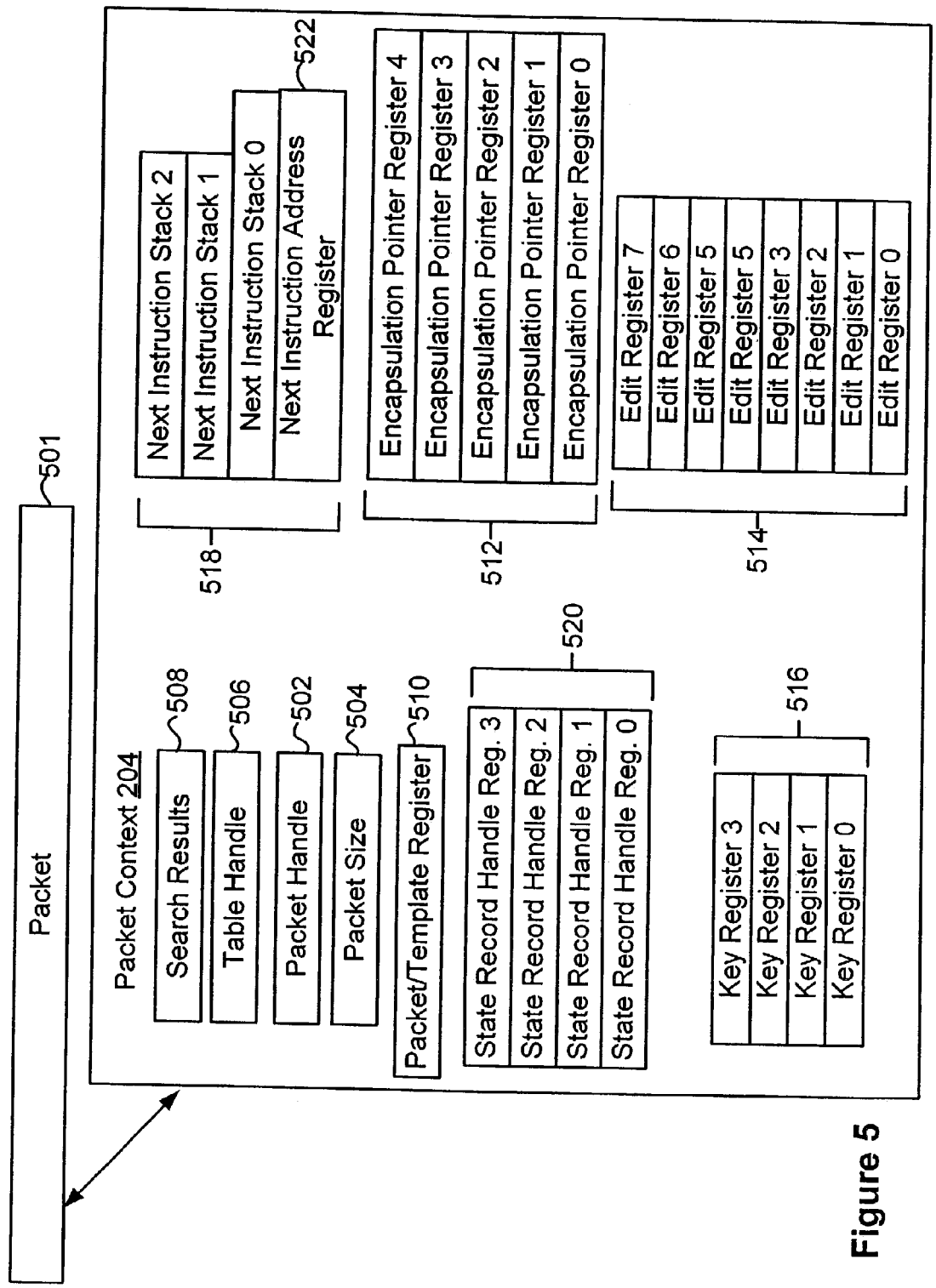
FIG. 5 is a block diagram that illustrates a packet and the packet context associated with that particular packet.

FIG. 5 is a block diagram that illustrates a packet 501 and the packet context 204 associated with that particular packet 501. When the packet 501 is first received the services processor 110, it is received by the packet input unit 210, which stores packet data into one or more free blocks in the cache 230. Control is then passed to the packet processing controller 200. To aid in processing, the packet processing controller 200 then initiates assignment of a packet context 204 to each received packet 501. In one embodiment, the packet context 204 is assigned to each packet 501 as soon has the packet fills the first block in cache 230 or the end of the packet 501 is detected. Each packet context 204 contains several different sets of registers for storing data related to the packet 501.

In these different sets of registers, the packet context 204 stores information related to a packet 501 and information used in processing of that packet 501 while that particular packet 501 is being processed. The packet context 204 is similar to a thread control in a processor in that the packet context 204 keeps track of the packet 501, what is being done to the packet 501, and what will be done to the packet 501. There is a separate packet context 204 for each packet 501 being processed by the services processor 110. In one embodiment, there are 256 packet contexts 204 in the services processor 110. This provides the services processor 110 with enough sets of packet context 204 registers to keep track of every packet 501 being processed. Other embodiments may have more or less packet contexts 204. When processing for a particular packet 501 is finished, the packet context 204 can be cleared and used for a new incoming packet 501. When a packet is received and there is no available packet context to assign to the packet, the packet will be placed in an input overflow queue. Packets in the input overflow queue can have higher, equal or lower priority than new input packets for packet context assignment.

What follows is a description of the information stored in a packet context 204 for each packet 501 in one embodiment of the present invention. In other embodiments, more, less, or different information can be stored in a packet context 204.

The packet context 204 includes information about the packet 501 itself. A packet handle register 502 stores a pointer to the location in memory of the packet 501 to which this packet context 204 relates. A packet size register 504 stores the size of the packet 501 to which this packet context 204 relates. In the case where packet processing starts as soon as the first cache block is full, the size of the packet may not be known when processing starts. In this case logic in the packet processing controller 200 and associated with the packet size register will detect references to the packet size before it becomes valid. If such an access occurs the processing of the packet will be suspended until the size is known.

A table handle register 506 stores a pointer to a lookup table that will be used next during packet processing. A search results register 508 stores the information returned from the last use of a lookup table.

A packet/template handle register 510 stores a pointer to another packet or to a template in memory. The packet/template handle register 510 will store a pointer to another packet in memory when, for example, an action that involves two packets is to be performed. One such example is when a concatenation of the packet 501 to which this packet context relates with another packet is performed. In one such an example, the packet handle register 502 stores a pointer that points to a first packet with a first header and a first payload. The packet/template handle register stores a pointer that points to a second packet with a second header and a second payload. The next instruction address register 522 stores a pointer to an action that, when processed by the table entry processor 202, causes the payload of the second packet to be added on to the payload of the first packet, resulting in the packet having the header and a payload that includes both the first and second payloads. This capability can be used in conjunction with other editing operations to perform complex packet editing operations such as IP reassembly. The packet/template register 510 can also store a pointer to a template stored in memory. This is useful, for example, when the packet 501 is of a known type. All the information common to that type of packet can then be retrieved from the template rather than from the packet 501 itself. This can improve efficiency in gathering information about a packet 501.

Encapsulation pointer registers 512 store encapsulation pointers that point to locations within the packet 501. Encapsulation pointer registers 512 are used to create encapsulation relative addresses within the packet 501. The first encapsulation pointer register 512, encapsulation pointer register 0, has a value of 0 and points to the beginning of the packet 501. The other encapsulation pointer registers 512 point to other arbitrarily defined locations within the packet. In the illustrated embodiment, there are five encapsulation pointer registers 512, although in other embodiments there may be more or fewer of these registers. The encapsulation pointers are used for simplified packet data accesses. In one embodiment, encapsulation pointer registers 512 are 16 bits, which enables allowable access to 64 kB packets.

Figure 6:
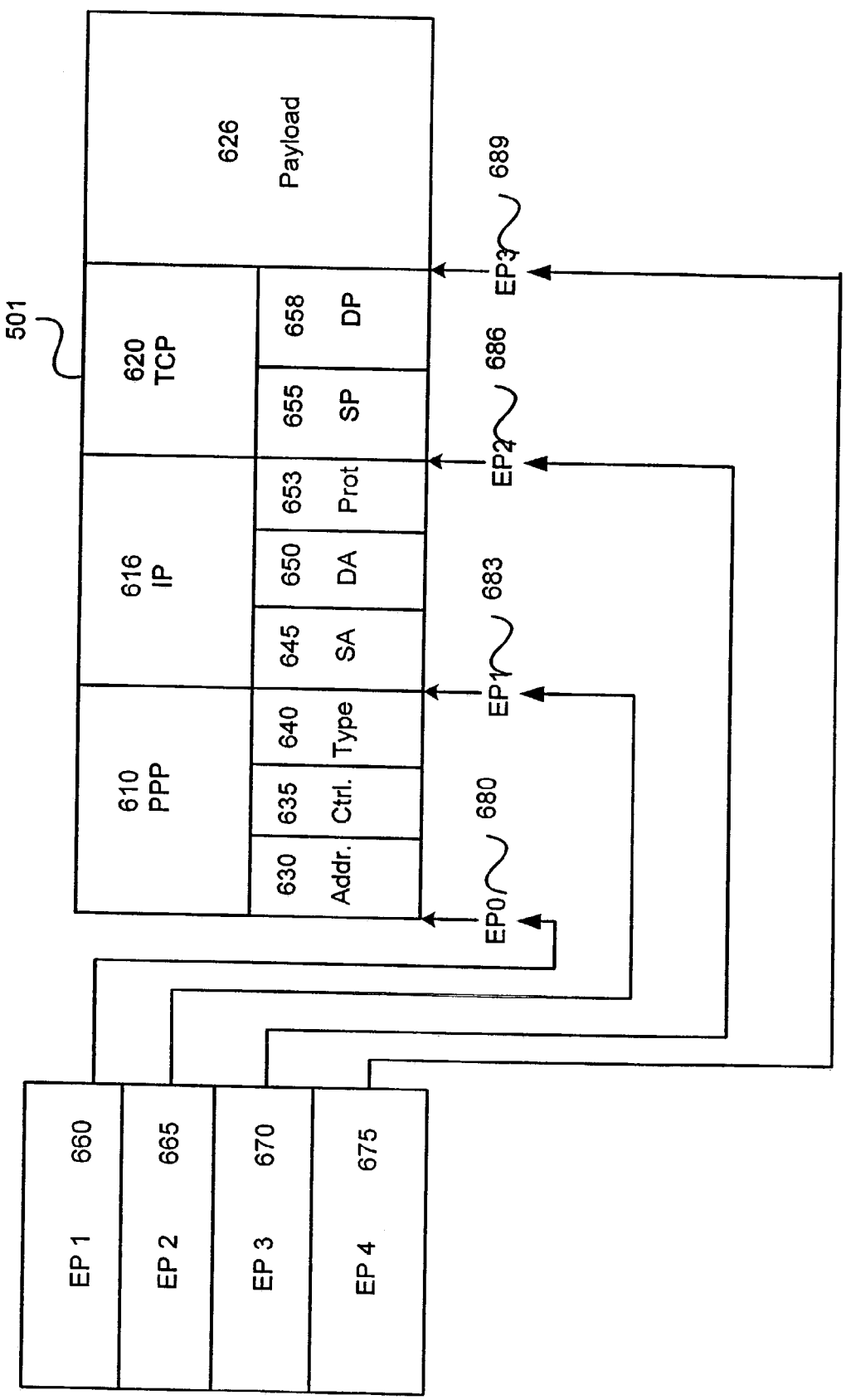
FIG. 6 is a block diagram illustrating a packet access interface using encapsulation registers to point to different protocol layers in the packet.

FIG. 6 is a block diagram illustrating a packet access interface. A packet 501 comprises multiple layers of network information. The packet 501 includes multiple successively encapsulated protocol layers containing control data for each protocol, and a payload 625 containing transmitted data. The packet 501 includes a Point to Point Protocol (PPP) layer 610, an Internet Protocol (IP) layer 615, and a Transmission Control Protocol Layer 620. The PPP layer includes address 630, control 635, and type 640 fields. The IP layer includes start address 645, destination address 650, and protocol discriminator 653 fields. The TCP layer includes start port 655 and destination port 658 fields. While PPP, IP, and TCP layers are shown herein, the services processor can parse and edit packets containing any variety and combination of protocol layers.

A series of encapsulation pointers 660, 665, 670, 675 are stored in the packet contexts 204. The encapsulation pointers 660, 665, 670, 675 are set to the appropriate "packet absolute" locations when the packet is first accepted by the packet input unit 210, the packet absolute locations indicating an offset relative to the beginning of the packet 501. The encapsulation pointers are associated with specific offsets within the packet, specifically the starting points 680, 683, 686, and 689 of each of the protocol layers 610, 615, 620 and the payload 625. The packet controller 200 receives requests to read or modify a packet in the form of the protocol layer to be modified and an offset within the protocol and converts the request to the packet location of the offset.

For example, a programming instruction directed to read the destination address of a packet could be directed to IP+X where X is the offset between the beginning 683 of the IP layer 615 and the location of the destination address 650 field of the packet. The packet processing controller 200 accepts the instruction and converts it to an instruction relative to the beginning of the packet.

In some instances, it will be useful to accept programming instructions for packets that are being edited by the services processor 110. For example, if the services processor 110 adds a Multi Protocol Label Switching (MPLS) field into the packet 501 between the PPP 610 and IP 615 layers, the offsets of the encapsulation pointers are shifted. Thus, in one embodiment programming commands also include an indicator of whether they are directed towards an output packet (includes MPLS) or an input packet (does not include MPLS).

Figure 7:
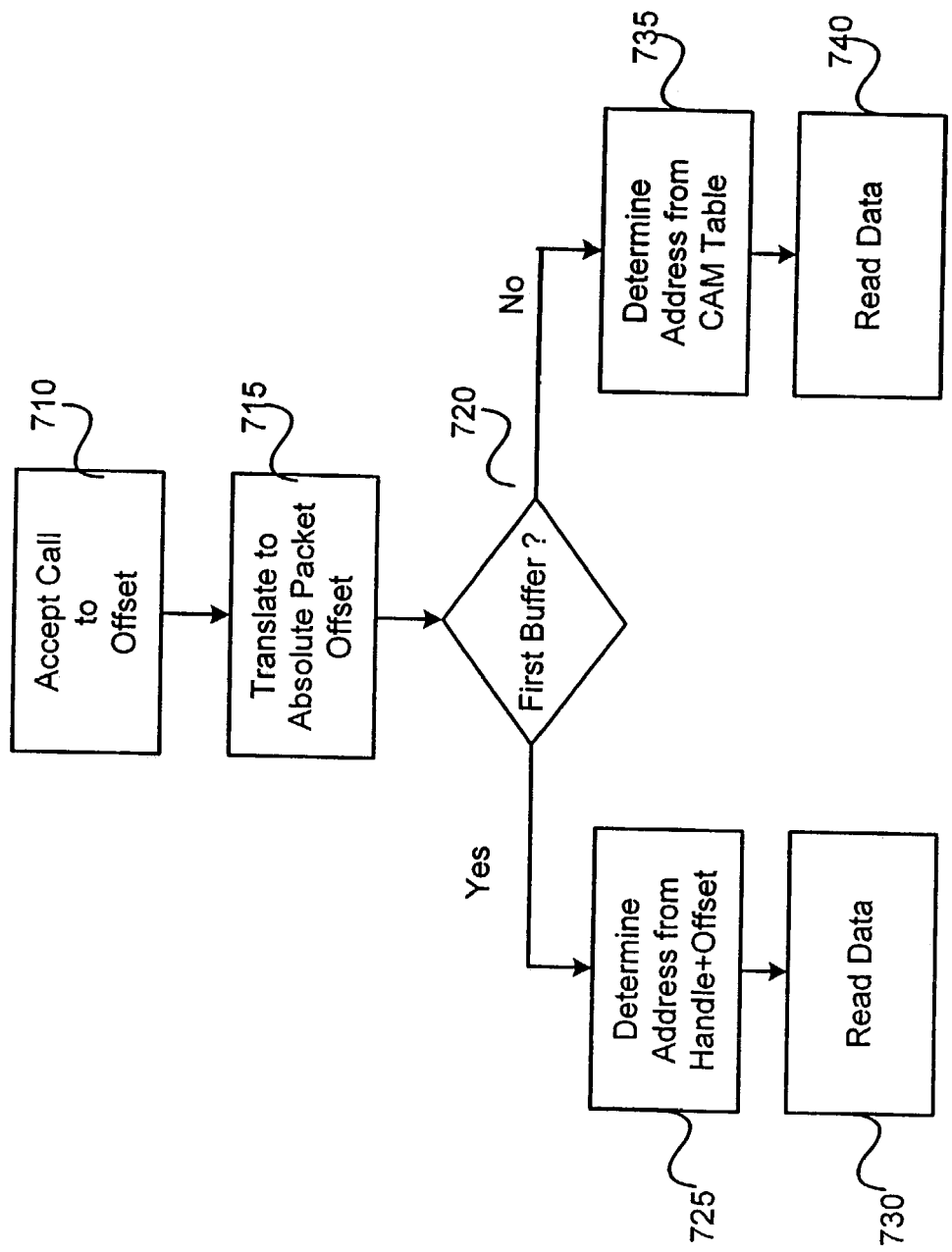
FIG. 7 flow chart illustrating a packet access operation including the translation of an encapsulation pointer relative packet address to a physical address.

FIG. 7 is a flow chart illustrating the translation of a packet access operation. In step 710, the packet processing controller 200 accepts a read instruction directed towards a packet 700. This read location is in the form of a protocol layer and an offset. In step 715, the packet processing controller 200 reads the encapsulation pointer associated with the requested protocol from the packet contexts 204 and determines the packet offset for the requested data location.

The packet processing controller 200 then determines in step 720 whether the requested packet data is in the first buffer 420 of the packet 700. This is performed by using the packet handle to determine the location of the first block and then checking the block size field of the buffer 420. If the offset is larger than the block size, then the data is stored in a later buffer. If the offset is less than the block size, then the data is stored in the first buffer.

If the data is stored in the first buffer, the packet processing controller 200 determines the memory location of the requested data in step 725 by adding the offset to the memory location in the packet handle. In step 730 the packet processing controller 200 reads the data and returns it to the requesting process.

If the data is stored in a later buffer, then in step 735 the packet process controller 200 determines the location by reading a CAM table of the kind described with respect to FIG. 4. Then, in step 740, the packet processing controller 200 reads the data and provides it to the requesting process.

Figure 8:
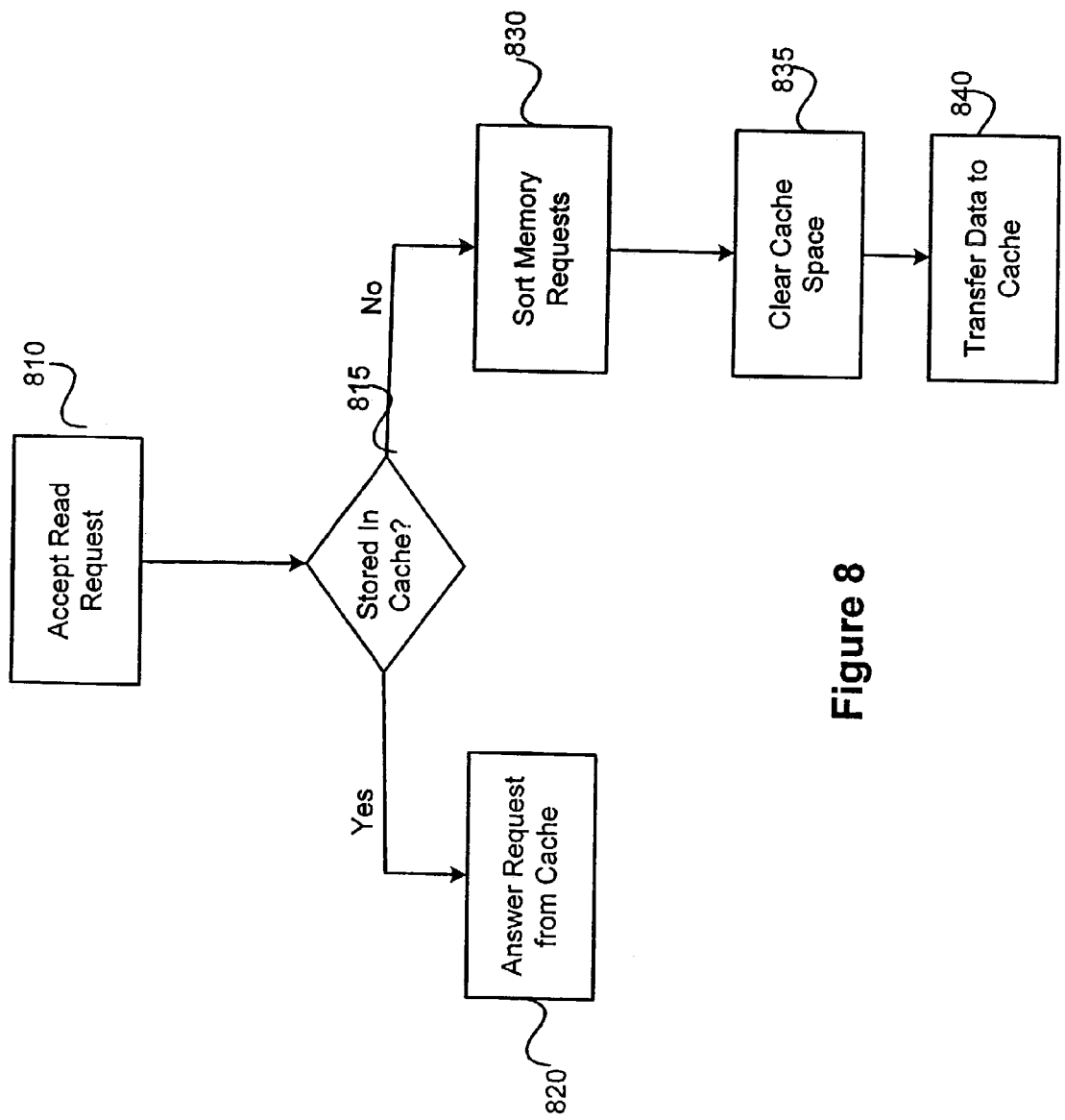
FIG. 8 is a flow chart illustrating a memory read operation.

FIG. 8 is a flow chart illustrating a memory read operation. In step 810 a memory read request is received for a location in memory 104/108. The cache and memory controller 230 checks the cache 235 in step 815 to determine whether the requested memory location is currently stored in the cache 235 (whether there is a cache hit or miss). If there is a cache hit, in step 820 the cache and memory controller 230 answers the memory read with the data from the cache 235

If the requested memory location does not appear in the cache, the request is passed to the memory controller 335, which in step 830 sorts currently pending memory requests to optimize overall throughput in the manner described in FIG. 3. Memory requests are shifted forward or backward in the FIFO 325 to prevent the FIFO 325 from stalling because a needed area of memory is currently used. Additionally, the memory controller 335 snoops pending write requests for memory ranges that include the requested memory range for a read transaction. If the memory controller 335 detects a match, it answers the pending read request with the data of the pending write request.

After the memory controller 335 answers the read request, in step 835 the cache and memory controller 230 creates space in the cache 235 for the requested data. The cache and memory controller 230 applies a weighted LRU algorithm to determine data that has the highest cost to remain in the cache. The highest cost data is cleared out of the cache 235. In step 840, the newly requested data is stored in the cache 230.

These and other embodiments of the present invention may be realized in accordance with the teachings described herein and it should be evident that various modifications and changes may be mad in these teachings without departing from the broader spirit and scope of the invention. The specification and drawings are, accordingly, to be regarded in an illustrative rather than restrictive sense and the invention measured only in terms of the claims.

What is claimed:

1. A method of processing an instruction for data in a packet, the method comprising:

editing protocol layers of the packet;

storing a plurality of encapsulation pointers, the encapsulation pointers associated with protocol layers and indicating offsets between a start point of the packet and start points of the edited version of the protocol layers of the packet;

receiving an instruction, the instruction comprising a protocol layer and an offset relative to a start point of the protocol layer;

indicating whether the instruction is directed towards the edited version of the protocol layers of the packet; and adding the offset relative to the start point of the protocol layer of the encapsulation pointer associated with the protocol layer to determine an offset relative to the beginning of the packet.

2. The method of claim 1, wherein the instruction is a read instruction.

3. The method of claim 1, wherein the instruction is a write instruction.

4. The method of claim 1, further comprising:

maintaining a packet handle, the packet handle indicating a location in memory of the start point of the packet; and adding the offset relative to the beginning of the packet to the value of the location in memory of the start point of the packet to determine a location in memory for the instruction.

5. The method of claim 1, wherein the editing of the protocol layers of the packet comprises adding a Multi Protocol Label Switching (MPLS) field into the packet.

6. An apparatus for processing instructions for a packet, the apparatus comprising:

an editing unit to edit protocol layers of the packet;

a packet context to store a plurality of encapsulation pointers, the encapsulation pointers associated with protocol layers and indicating offsets between a start point of the packet and start points of the edited version of the protocol layers of the packet; and a packet processing controller to:

receive an instruction, the instruction comprising a protocol layer and an offset relative to a start point of the protocol layer, indicate whether the instruction is directed towards the edited version of the protocol layers of the packet, and add the offset relative to the start point of the protocol layer to the encapsulation pointer associated with the protocol layer to determine an offset relative to the beginning of the packet.

7. The apparatus of claim 6, wherein the instruction is a read instruction.

8. The apparatus of claim 6, wherein the instruction is a write instruction.

9. The apparatus of claim 6, wherein:

the packet context stores a packet handle, the packet handle indicating a location in memory of the start point of the packet; and the packet processing controller to add the offset relative to the beginning of the packet to the value of the location in memory of the start point of the packet to determine a location in memory for the instruction.

10. The apparatus of claim 6, wherein the editing of the protocol layers of the packet comprises adding a Multi Protocol Label Switching (MPLS) field into the packet.

11. The apparatus of claim 6, wherein the packet processing controller includes a table entry processor to process one or more of the following: comparison tables, action tables, and state tables.

12. The apparatus of claim 6, further comprising a field extraction unit coupled to the packet processing controller, the field extraction unit to retrieve packet data from a cache, extract portions of packets referenced by an extract request, and return the extracted portions of the packets to the packet processing controller.

13. An apparatus for processing packets, the apparatus comprising:

an editing unit to edit protocol layers of the packet;

a packet context to store a plurality of encapsulation pointers, the encapsulation pointers associated with protocol layers and indicating offsets between a start point of the packet and start points of the edited version of the protocol layers of the packet;

a memory storing a packet in a plurality of buffers; and a packet processing controller to:

store a packet handle for the packet, the packet handle indicating a location in the memory for a first buffer of the packet;

receive an instruction for the packet, the instruction comprising a protocol layer and an offset relative to the start point of the protocol layer;

determine whether a location in memory corresponding to the offset relative to the start point of the protocol layer is stored in the first buffer of the packet;

determine whether the instruction is directed towards the edited version of the protocol layers of the packet; and add the offset relative to the start point of the protocol layer to the value of the packet handle indicating a location in memory of the start point of the packet to determine a location in memory for the instruction, when the location in memory corresponding to the offset relative to the beginning of the packet is stored in the first buffer of the packet.

14. The apparatus of claim 13, wherein the instruction is a read instruction.

15. The apparatus of claim 13, wherein the instruction is a write instruction.

16. The apparatus of claim 13, wherein the packet processing controller is further to:

determine a size of the first buffer; and determine that the location in memory corresponding to the offset relative to the start point of the packet is stored in a first buffer of the packet when the magnitude of the offset is smaller than the size of the first buffer.

17. A system comprising:

a packet input unit to process an incoming packet;

an editing unit coupled to the packet input unit, the editing unit to edit protocol layers of the packet;

a packet context to store a plurality of encapsulation pointers, the encapsulation pointers associated with protocol layers and indicating offsets between a start point of the packet and start points of the edited version of the protocol layers of the packet;

a packet processing controller to receive an instruction, the instruction comprising a protocol layer and an offset relative to a start point of the protocol layer, indicate whether the instruction is directed towards the edited version of the protocol layers of the packet, add the offset relative to the start point of the protocol later to the encapsulation pointer associated with the protocol layer to determine an offset relative to the beginning of the packet; and a packet output unit to output the edited version of the packet.

18. The system of claim 17, further comprising:

a search processor to send search requests for data located in the memory; and a cache and memory controller to determine whether the request to the location in the memory is stored in a cache.

19. The system of claim 17, wherein the packet context stores a packet handle, the packet handle indicating a location in memory of the start point of the packet and the packet processing controller adds the offset relative to the beginning of the packet to the value of the location in memory of the start point of the packet to determine a location in memory for the instruction.

* * * * *